(12) United States Patent
Kuo

(10) Patent No.: US 10,865,924 B2
(45) Date of Patent: *Dec. 15, 2020

(54) QUICK-DISASSEMBLY NIPPLE CONNECTOR STRUCTURE

(71) Applicant: Shuoxing Metal Products (Kunshan) CO., LTD., Jiangsu (CN)

(72) Inventor: Heng-Chia Kuo, Jiangsu (CN)

(73) Assignee: Shuoxing Metal Products (Kunshan) Co., Ltd., Kunshan (CN)

(*) Notice: Subject to any disclaimer, the term of this patent is extended or adjusted under 35 U.S.C. 154(b) by 217 days.

This patent is subject to a terminal disclaimer.

(21) Appl. No.: 16/115,422

(22) Filed: Aug. 28, 2018

(65) Prior Publication Data

US 2020/0041055 A1 Feb. 6, 2020

(30) Foreign Application Priority Data

Aug. 1, 2018 (CN) ..................... 2018 2 1228549 U

(51) Int. Cl.
| | |
|---|---|
| *F16L 37/138* | (2006.01) |
| *F16N 21/02* | (2006.01) |
| *F16L 37/10* | (2006.01) |
| *F16L 19/07* | (2006.01) |
| *F16N 3/12* | (2006.01) |

(52) U.S. Cl.
CPC ............. *F16L 37/138* (2013.01); *F16L 19/07* (2013.01); *F16L 37/101* (2013.01); *F16N 21/02* (2013.01); *F16N 3/12* (2013.01)

(58) Field of Classification Search
CPC ........ F16L 19/07; F16L 37/138; F16L 37/122; F16L 37/16; F16L 37/20; F16L 37/08; F16N 21/00
USPC ............ 285/34, 38, 322, 323, 324, 312, 318
See application file for complete search history.

(56) References Cited

U.S. PATENT DOCUMENTS

| | | | | |
|---|---|---|---|---|
| 5,060,982 | A | † | 10/1991 | Matsushita |
| 2012/0267890 | A1* | | 10/2012 | Gurney ................. F16L 37/138 285/308 |
| 2018/0299065 | A1* | | 10/2018 | Hung ....................... F16N 3/12 |
| 2019/0120413 | A1* | | 4/2019 | Verma ................... F16L 37/121 |

(Continued)

FOREIGN PATENT DOCUMENTS

| | | | |
|---|---|---|---|
| AU | 2017101056 | A4 † | 9/2017 |
| CN | 203604869 | U † | 5/2014 |
| TW | M278816 | U † | 10/2005 |

*Primary Examiner* — Aaron M Dunwoody
(74) *Attorney, Agent, or Firm* — Wang Law Firm, Inc.

(57) ABSTRACT

Disclosed is a quick-disassembly nipple connector structure, which is mainly composed of a hollow pipe, a pivoting assembly, a screwing member, a plurality of gripping jaws, a sleeve, a handle and a spring. The handle is additionally disposed on the sleeve and the pivoting assembly; when the handle is not pulled, the sleeve is located at a lock position to lock a grease nipple; and when the handle is pulled downwards, the sleeve is located at a release position to release the grease nipple. The quick-disassembly nipple connector structure can be rapidly switched to the lock position or the release position, thus, facilitating operation, shortening the work time, achieving accurate alignment, improving work efficiency, and avoiding damage to internal parts caused by excessive force application by users.

5 Claims, 8 Drawing Sheets

(56) References Cited

U.S. PATENT DOCUMENTS

2019/0333420 A1* 10/2019 Danielson ............... F16L 37/20
2020/0032957 A1* 1/2020 Salomon ................. F16N 21/04

\* cited by examiner
† cited by third party

QUICK-DISASSEMBLY NIPPLE CONNECTOR STRUCTURE

BACKGROUND

1. Technical Field

The present invention relates to a nipple connector structure, in particular to a quick-disassembly nipple connector structure.

2. Description of Related Art

At present, in the machinery field, grease usually needs to be injected between machine parts to achieve a lubrication effect by a grease gun connected to a nipple connector structure, so that the machine parts are protected, and the life of the machine parts is prolonged.

Please refer to FIG. 1 which shows an existing nipple connector structure. The existing nipple connector structure 1 is pushed to be combined with a grease nipple 2, but when the nipple connector structure 1 needs to be separated from the grease nipple 2, users have to shake the nipple connector structure 1 upwards and downwards or leftwards and rightwards by holding the outer surface of the nipple connector structure 1 so as to separate the nipple connector structure 1 from the grease nipple 2. However, in this separation process, a plurality of gripping jaws 3 of the nipple connector structure 1 are pulled and are prone to breakage if the users forcibly pull the nipple connector structure 1 down from the grease nipple 2, thus, resulting in damage to the plurality of gripping jaws 3. In addition, due to the excessive clamping force of the plurality of gripping jaws 3, the users cannot separate the nipple connector structure 1 from the grease nipple 2, resulting in inconvenience in operation and use and high time and labor consumption and reducing service efficiency.

Moreover, by the fact that the applicable operation space of the nipple connector structure 1 is already very small, an extra operation space is needed by the users, and consequentially, the operation speed of the users is extremely low, the nipple connector structure 1 and the grease nipple 2 cannot be accurately aligned, and the operation space is limited.

In view of this, the research and improvement objective of the present invention is to overcome the conventional problems and defects mentioned above.

BRIEF SUMMARY OF THE INVENTION

One objective of the present invention is to provide a quick-disassembly nipple connector structure, which is typically pressed to be rapidly switched to a lock position or a release position, thus, saving time and labor, facilitating operation, and avoiding damage caused by excessive force application.

Another objective of the present invention is to provide a quick-disassembly nipple connector structure, which has an adjustable pivoting angle, is suitable for a small or limited space and facilitates operation.

The quick-disassembly nipple connector structure of the present invention is suitable for being connected to a grease nipple and comprises:

a hollow pipe, wherein the hollow pipe extends in an axial direction and is provided with a handheld part, a screwing part opposite to the handheld part, and a pivoting part located between the handheld part and the screwing part;

a pivoting assembly, wherein the pivoting assembly is disposed around the pivoting part in a pivoting manner and abuts against the handheld part;

a screwing member, wherein the screwing member is in screw joint with the screwing part and is concavely provided with a ring groove;

a plurality of gripping jaws, wherein each gripping jaw is provided with a first sleeving end to be disposed around the ring groove and a second sleeving end opposite to the first sleeving end and to be disposed around the grease nipple;

a sleeve, wherein the sleeve is pivoted on the screwing member and the plurality of gripping jaws in a manner of reciprocating in the axial direction, is provided with a convex abutting part having a concave inner circular wall and abutting against the plurality of gripping jaws and a joint hole penetrating through the sleeve, and can move between a lock position and a release position; when located at the lock position, the sleeve is close to the pivoting assembly, and the plurality of gripping jaws protrude out of the joint hole; and when located at the release position, the sleeve is away from the pivoting assembly, the plurality of gripping jaws do not protrude out of the joint hole, and the grease nipple is sleeved with the second sleeving ends of the plurality of gripping jaws;

a handle, wherein the handle is disposed on the pivoting assembly and the sleeve to drive the sleeve to move to the lock position or the release position in the axial direction, and the handle is driven by the pivoting assembly and the sleeve to pivot synchronously along with the pivoting assembly and the sleeve; and a spring, wherein the spring is connected to the handle and the pivoting assembly and provides an elastic force to push the handle, so that the sleeve is driven by the handle to be located at the lock position in the normal state.

Preferably, the spring is a torsion spring.

Preferably, the quick-disassembly nipple connector structure further comprises a shaft lever, wherein the shaft lever penetrates through the handle and is sleeved with the spring, and the spring is provided with a first abutting part abutting against the handle and a second abutting part opposite to the first abutting part and abutting against the pivoting assembly.

Preferably, the hollow pipe is concavely provided with a positioning ring groove located between the screwing part and the pivoting part. The quick-disassembly nipple connector structure further comprises a C-shaped retaining ring, which is disposed in the positioning ring groove and has an end abutting against the sleeve and an end abutting against the pivoting assembly.

Preferably, the hollow pipe is concavely provided with a limiting ring groove, which is located between the pivoting part and the screwing part and is covered by the pivoting assembly. The quick-disassembly nipple connector structure further comprises four locking components and two spacers. Each locking component is provided with a head and a body connected to the head. Two of the four locking components respectively penetrate through the two spacers to be locked on the pivoting assembly, with the heads abutting against the spacers and the bodies corresponding to the limiting ring groove. The other two locking components are locked on the sleeve, with the heads abutting against the sleeve.

From the above description, the quick-disassembly nipple connector structure of is mainly composed of the hollow pipe, the pivoting assembly, the screwing member, the plurality of gripping jaws, the sleeve, the handle and the spring. The handle is additionally disposed on the sleeve and the pivoting assembly; when the handle is not pulled, the sleeve is located at the lock position to lock the grease nipple; and when the handle is pulled downwards, the sleeve is located at the release position to release the grease nipple. The quick-disassembly nipple connector structure can be rapidly switched to the lock position or the release position, thus, facilitating operation, shortening the work time, achieving accurate alignment, improving work efficiency, and avoiding damage to internal parts caused by excessive force application by users.

In addition, the pivoting assembly and the sleeve can movably pivot and can also drive the handle so that the users can perform angle adjustment according to requirements so as to adjust the quick-disassembly nipple connector structure to the proper position, thus, improving the service efficiency. In addition, the quick-disassembly nipple connector structure is not limited by narrow spaces, thus, facilitating operation and improving the product competitiveness.

DETAILED DESCRIPTION OF THE INVENTION

Figure 1:
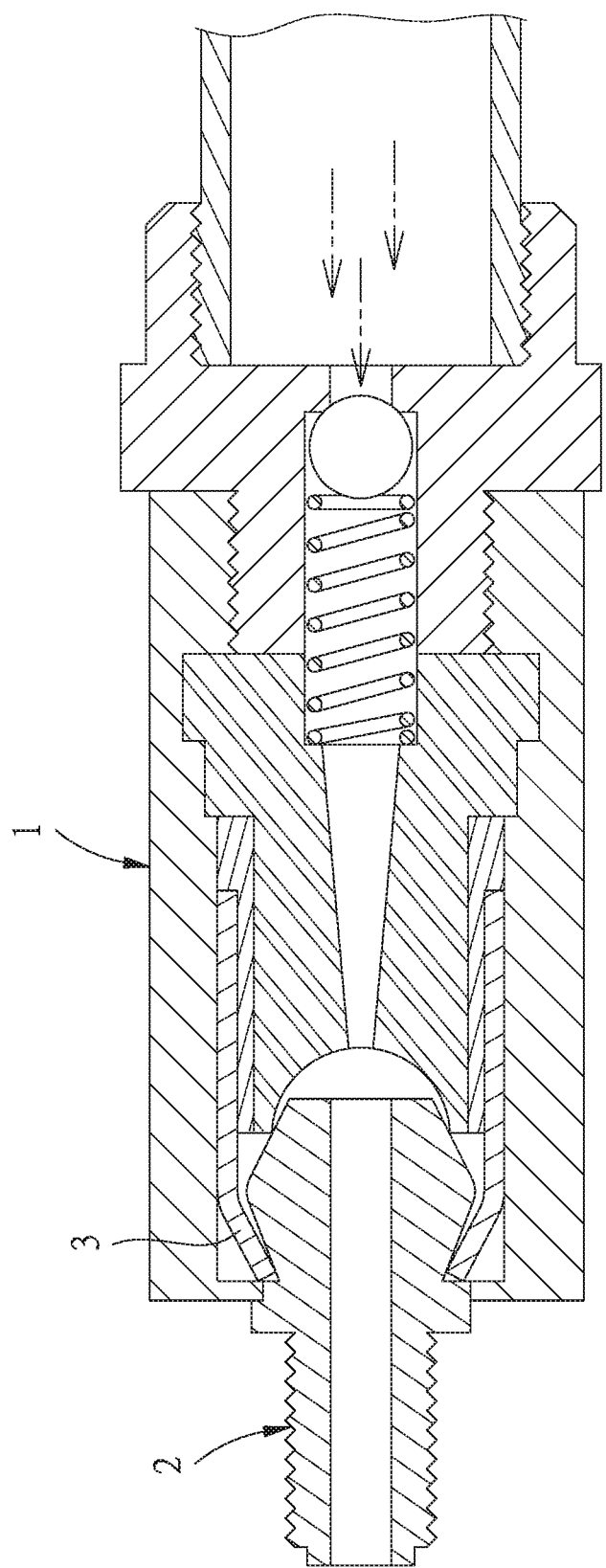
FIG. 1 is a sectional view of an existing nipple connector structure.
Figure 2:
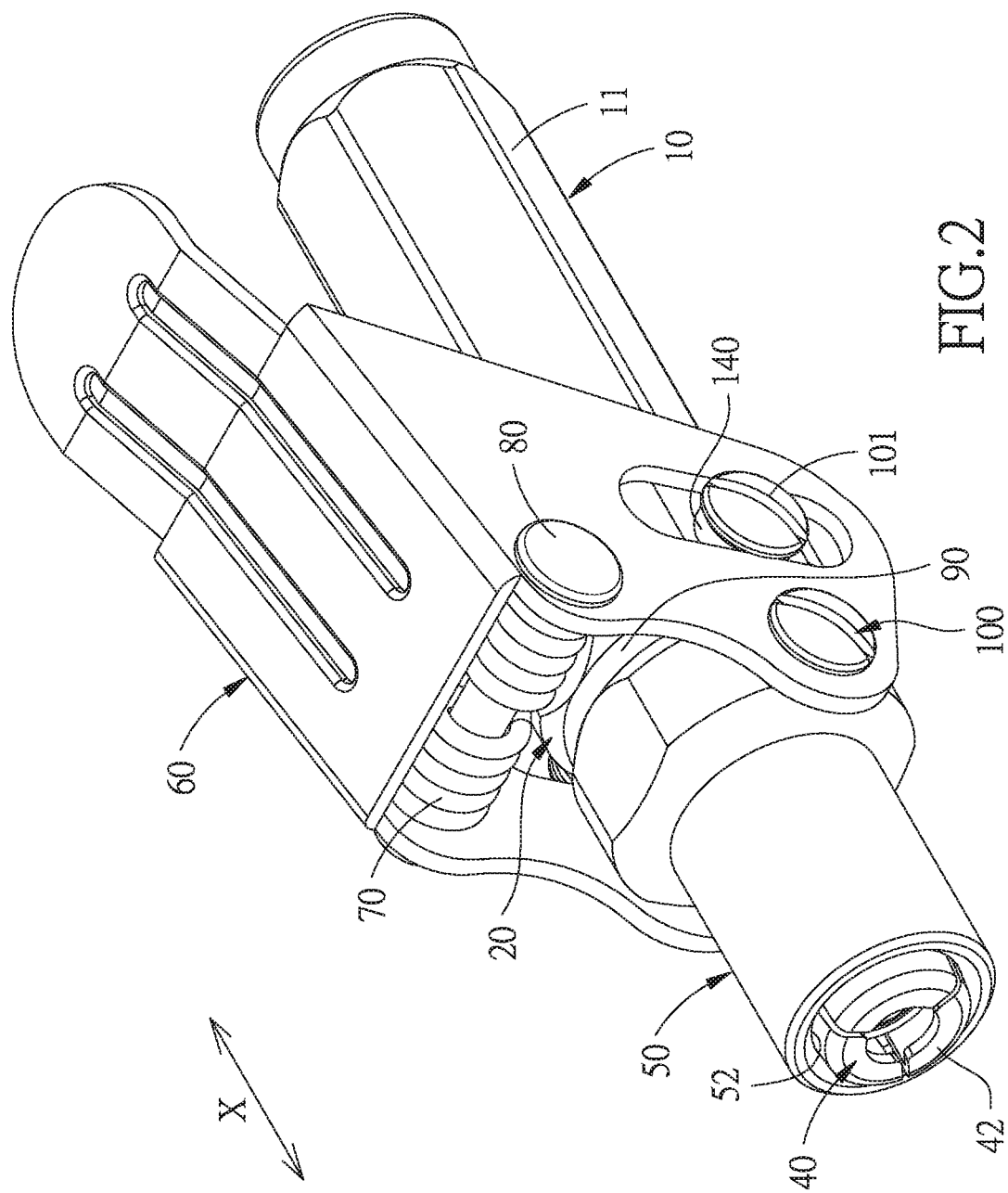
FIG. 2 is a perspective view of one embodiment of the present invention.
Figure 3:
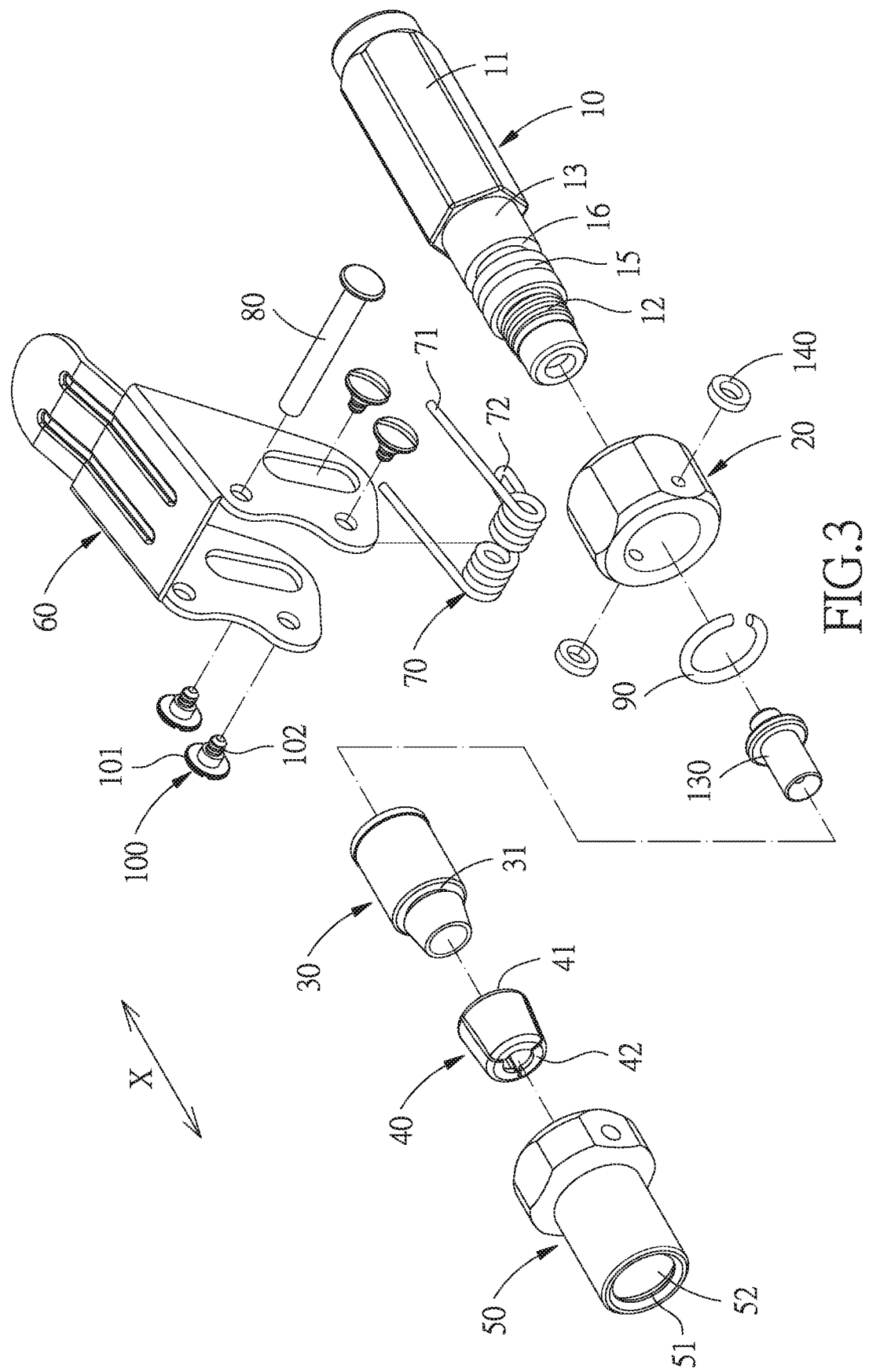
FIG. 3 is a disassembled view of one embodiment of the present invention.

The technical scheme of the present invention is clearly and completely described as follows in combination with the drawings. Apparently, the embodiments in the following description are only parts of embodiments of the present invention instead of all embodiments of the present invention. All other embodiments obtained based on these embodiments by those ordinarily skilled in this field without creative work should fall within the protection scope of the present invention.

As shown in FIGS. 2-8, the present invention provides a quick-disassembly nipple connector structure, which is suitable for being connected to a grease nipple A. The quick-disassembly nipple connector structure is mainly composed of a hollow pipe 10, a pivoting assembly 20, a screwing member 30, a plurality of gripping jaws 40, a sleeve 50, a handle 60 and a spring 70, wherein:

The hollow pipe 10 is linear, extends in an axial direction X and is provided with a handheld part 11, a screwing part 12 opposite to the handheld part 11, and a pivoting part 13 located between the handheld part 11 and the screwing part 12. Furthermore, an oil passage 14 penetrates through the hollow pipe 10. A spring piece 110, a ball 120 and an abutting piece 130 are disposed in the hollow pipe 10. One end of the spring piece 110 abuts against the ball 120 so as to block an oil outlet 141 of the oil passage 14, and the other end of the spring piece 110 abuts against the abutting piece 130.

The pivoting assembly 20 is disposed around the pivoting part 13 in a pivoting manner and abuts against the handheld part 11. Furthermore, the pivoting assembly 20 can pivot in a radial direction with the hollow pipe 10 as the center. Through the configuration of the pivoting assembly 20, different holding angles can be provided for users to facilitate operation, thus, overcoming the defect of a limited operation space.

The screwing member 30 is in screw joint with the screwing part 12 and abuts against the front end of the hollow pipe 10, and a ring groove 31 is concavely formed in the outer surface of the screwing member 30. Furthermore, the hollow pipe 10 is concavely provided with a positioning ring groove 15 located between the screwing part 12 and the pivoting part 13. The quick-disassembly nipple connector structure further comprises a C-shaped retaining ring 90, which is disposed in the positioning ring groove 15 and has an end abutting against the sleeve 50 and an end abutting against the pivoting assembly 20. Furthermore, the hollow pipe 10 is concavely provided with a limiting ring groove 16, which is located between the pivoting part 13 and the positioning ring groove 15 and covered by the pivoting assembly 20. The quick-disassembly nipple connector structure further comprises four locking components 100 and two spacers 140. Each locking component 100 is provided with a head 101 and a body 102 connected to the head 101. Two of the four locking components 100 respectively penetrate through the two spacers 140 to be locked on the pivoting assembly 20, with the heads 101 abutting against the spacers 140 and the bodies 102 corresponding to the limiting ring groove 16. The other two locking components 100 are locked on the sleeve 50, with the heads 101 abutting against the sleeve 50.

Each of the plurality of gripping jaws 40 is provided with a first sleeving end 41 to be disposed around the ring groove 31 and a second sleeving end 42 opposite to the first sleeving end 41 and to be disposed around the grease nipple A.

The sleeve 50 is pivoted on the screwing member 30 and the plurality of gripping jaws 40 in a manner of reciprocating in the axial direction X, is provided with a convex abutting part 51 having a convex inner circular wall and abutting against the plurality of gripping jaws and a joint hole 52 penetrating through the sleeve 52, and can move between a lock position P1 and a release position P2. When located at the lock position P1, the sleeve 50 is close to the pivoting assembly 20, and the plurality of gripping jaws 40 protrude out of the joint hole 52. When located at the release position P2, the sleeve 50 is away from the pivoting assembly 20, the plurality of gripping jaws 40 do not protrude out of the joint hole 52, and the grease nipple A is sleeved with the second sleeving ends 42 of the plurality of gripping jaws 40. Furthermore, the sleeve 50 is disposed around the front end of the hollow pipe 10 and covers the plurality of gripping jaws 40. The convex abutting part 51 abuts against the plurality of gripping jaws 40 so as to actuate the gripping jaws 40 to open or close. Furthermore, the sleeve 50 and the pivoting assembly 20 pivot in the radial direction with the hollow pipe 10 as the center.

The handle 60 is disposed on the pivoting assembly 20 and the sleeve 50 to drive the sleeve 50 to move to the lock position P1 or the release position P2 in the axial direction X. The handle 60 can be driven by the pivoting assembly 20 and the sleeve 50 to pivot synchronously along with the pivoting assembly 20 and the sleeve 50. Furthermore, the handle 60 can pivot upwards or downwards to control the sleeve 50 to move to the lock position P1 or the release position P2, and thus, the grease nipple A is clamped or released. In this way, the work time is shortened, accurate alignment is achieved, work efficiency is improved, and damage to internal parts caused by excessive force application by the users is avoided.

The spring 70 is a torsion spring, is connected to the handle 60 and the pivoting assembly 20 and provides an elastic force to push the handle 60, so that the sleeve 50 is driven by the handle 60 to be located at the lock position P1 in the normal state. In this embodiment, the quick-disassembly nipple connector structure further comprises a shaft lever 80, which penetrates through the handle 50 and is sleeved with the spring 70. The spring 70 is provided with a first abutting part 71 abutting against the handle 60 and a second abutting part 72 opposite to the first abutting part 71 and abutting against the pivoting assembly 20.

The quick-disassembly nipple connector structure of the present invention is formed by the above components. The usage condition of the quick-disassembly nipple connector structure is further described as follows.

Figure 4:
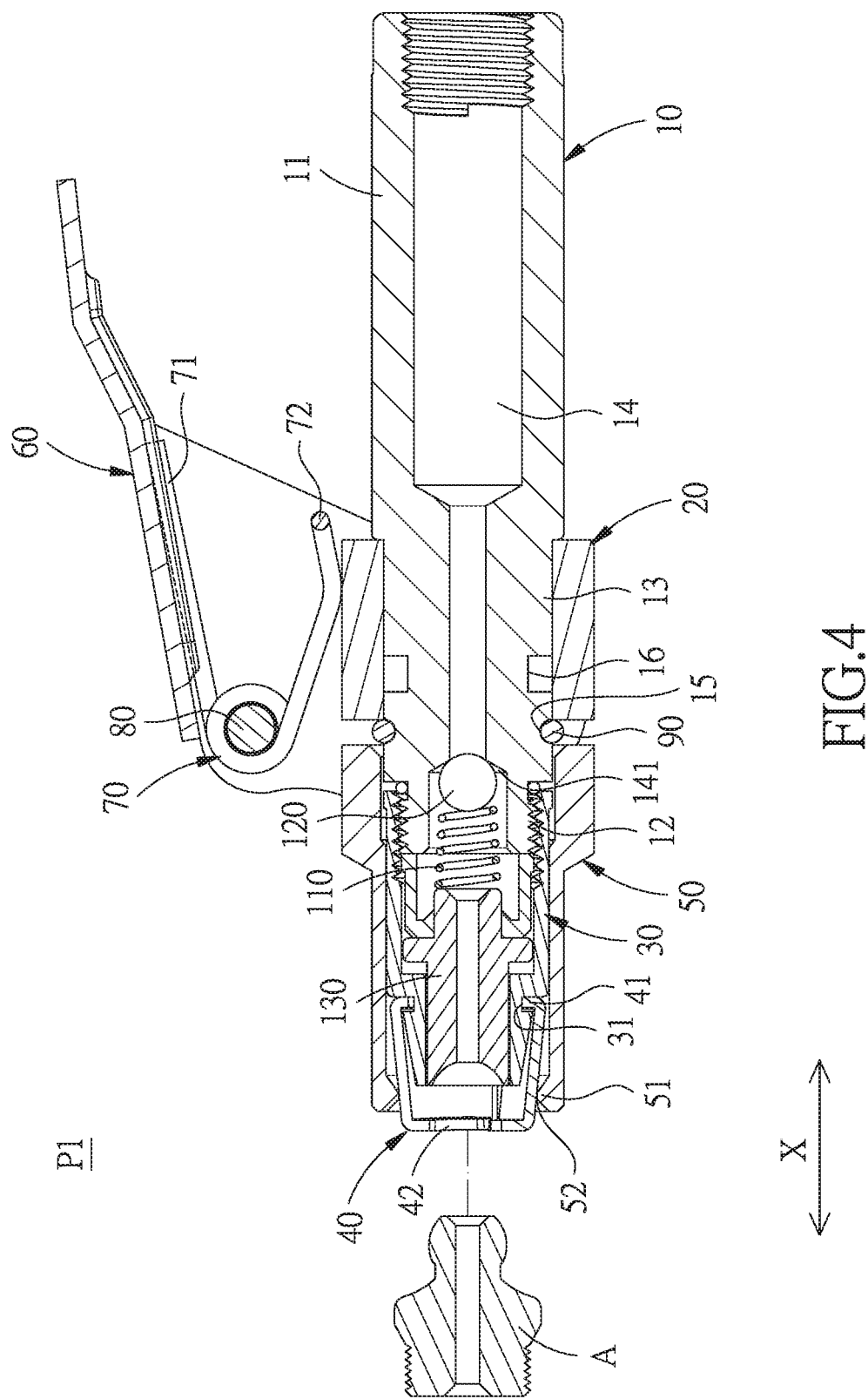
FIG. 4 is a first usage status view of one embodiment of the present invention.
Figure 5:
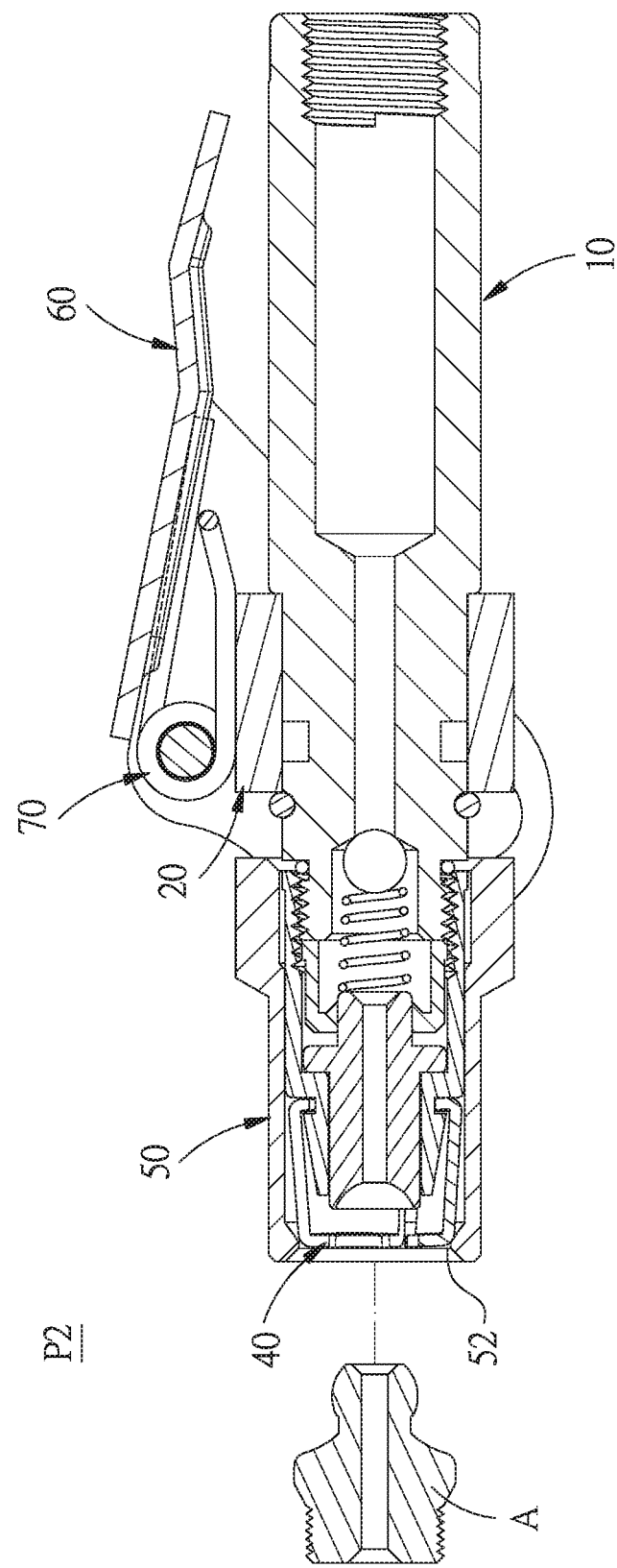
FIG. 5 is a second usage status view of one embodiment of the present invention.
Figure 6:
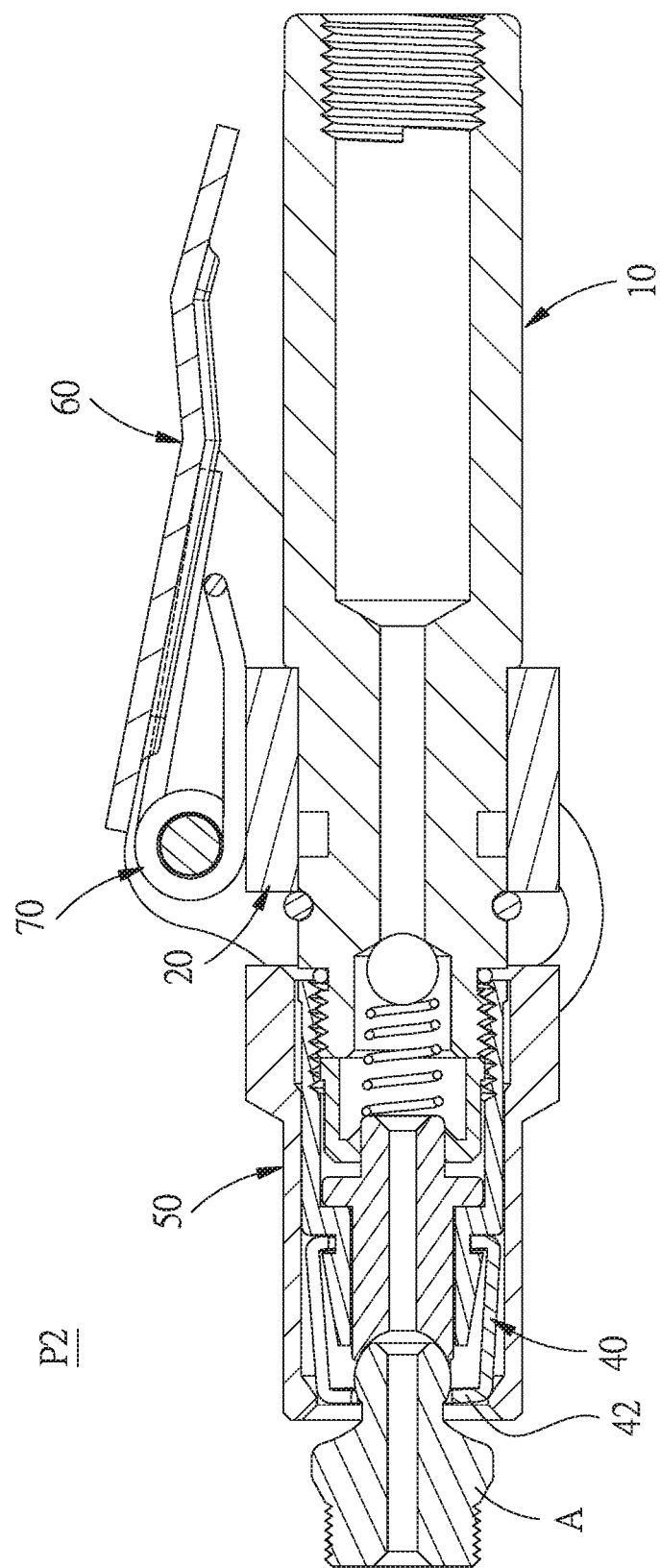
FIG. 6 is a third usage status view of one embodiment of the present invention.
Figure 7:
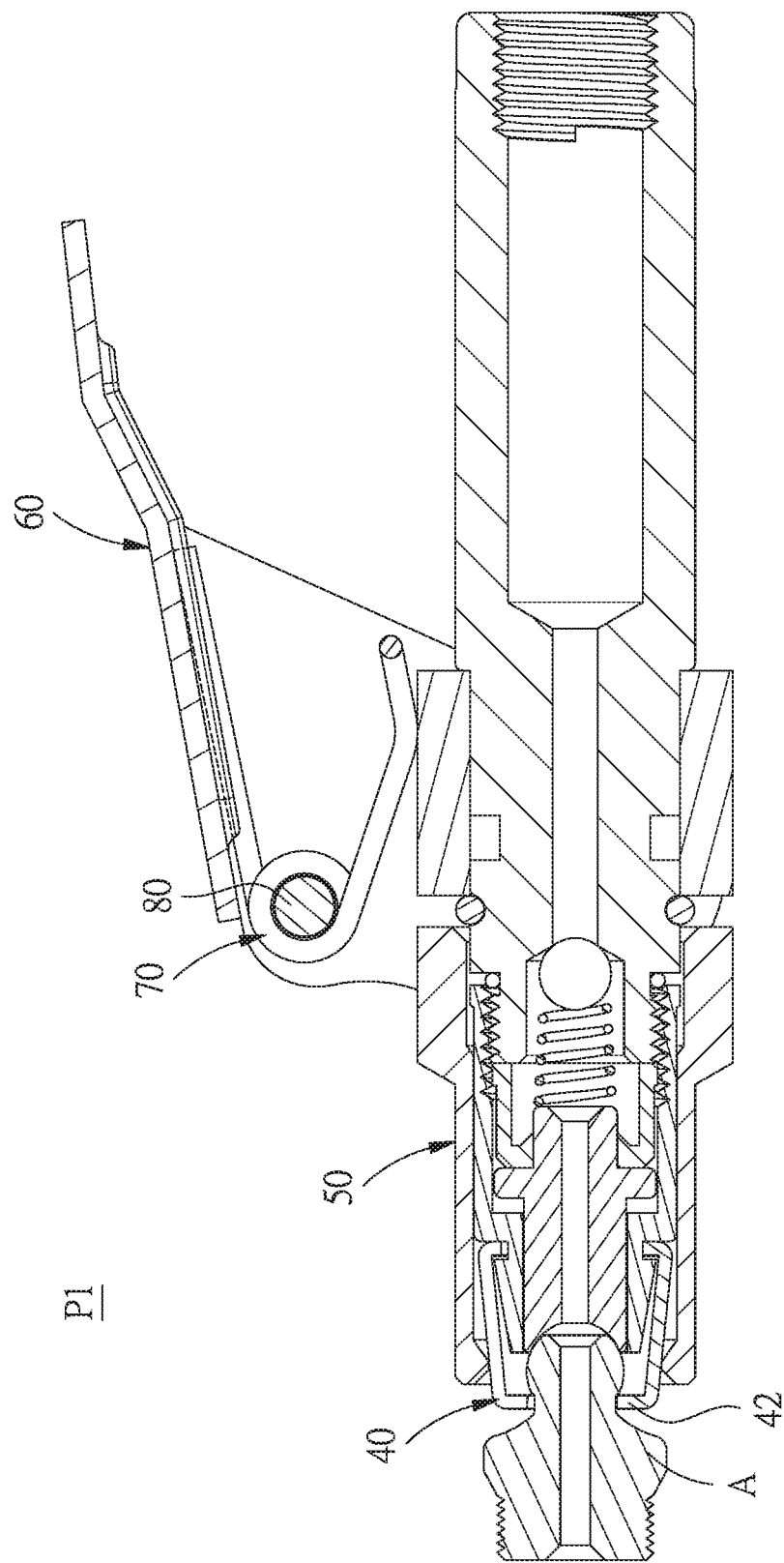
FIG. 7 is a fourth usage status view of one embodiment of the present invention.

As shown in FIG. 4, the quick-disassembly nipple connector structure is not combined with the grease nipple A initially, the handle 60 is pushed by the spring 70 in the normal state, the sleeve 50 is located at the lock position P1 and is close to the pivoting assembly 20, and the plurality of gripping jaws 40 protrude out of the joint hole 52 and are closed under the effect of the convex abutting part 51. As shown in FIG. 5, the quick-disassembly nipple connector structure is still not combined with the grease nipple A, the handle 60 is pulled downwards to make the sleeve 50 move to the release position P2 and away from the pivoting assembly 20, the plurality of gripping jaws 40 do not protrude out of the joint hole 52 and are opened, and at this moment, the joint hole 50 is aligned to the grease nipple A by the users so as to be combined with the grease nipple A. As shown in FIG. 6, the quick-disassembly nipple connector structure is combined with the grease nipple A, the handle 60 is still pulled downwards, the sleeve 50 is located at the release position P2, the plurality of gripping jaws 40 are opened, and the second sleeving ends 42 of the plurality of gripping jaws 40 correspond to the outer surface of the grease nipple A, but do not clamp the grease nipple A. As shown in FIG. 7, the quick-disassembly nipple connector structure is combined with the grease nipple A, the handle 60 is released by the users and then is pushed by the spring 70 to rebound upwards, at this moment, the sleeve 50 is located at the lock position P1, and the second sleeving ends 42 of the plurality of clamping jaws 40 clamp the grease nipple A. From the above description, by the fact that the handle 60 is additionally disposed on the sleeve 50 and the pivoting assembly 20, the quick-disassembly nipple connector structure can be rapidly switched to the lock position P1 or the release position P2, thus, saving time and labor, facilitating operation, and avoiding damage caused by excessive force application.

Figure 8:
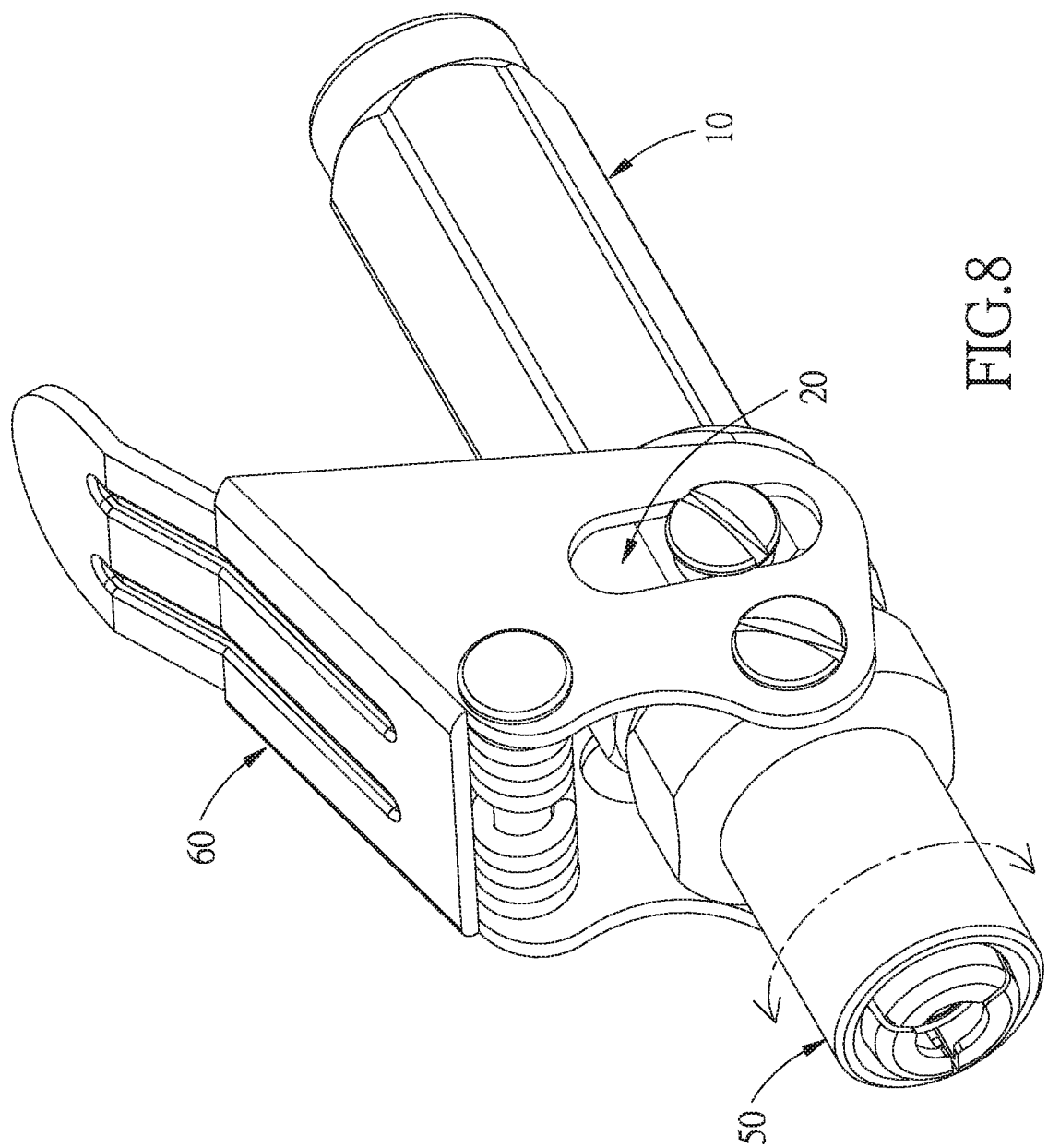
FIG. 8 is a perspective usage status view of one embodiment of the present invention and shows that a pivoting assembly and a sleeve can movably pivot and drive a handle.

As shown in FIG. 8, the pivoting assembly 20 and the sleeve 50 can movably pivot in the radial direction with the hollow pipe 10 as the center and can also drive the handle 60. Compared with a common fixing manner, the users can pivot the quick-disassembly nipple connector structure according to different limited spaces during operation, so that spatial limitations are avoided. The users can pivot the quick-disassembly nipple connector structure by required angles, and thus, the functional requirements for multi-angle pivoting and convenient usage are met.

The structure and configuration of all the components of the quick-disassembly nipple connector structure of the present invention are described above.

From the above description, the quick-disassembly nipple connector structure is mainly composed of the hollow pipe 10, the pivoting assembly 20, the screwing member 30, the plurality of gripping jaws 40, the sleeve 50, the handle 60 and the spring 70. The handle 60 is additionally disposed on the sleeve 50 and the pivoting assembly 20; when the handle 60 is not pulled, the sleeve 50 is located at the lock position P1 to lock the grease nipple A; and when the handle 60 is pulled downwards, the sleeve 50 is located at the release position P2 to release the grease nipple A. The quick-disassembly nipple connector structure can be rapidly switched to the lock position P1 or the release position P2, thus, facilitating operation, shortening the work time, achieving accurate alignment, improving work efficiency, and avoiding damage to the internal parts caused by excessive force application by the users.

In addition, the pivoting assembly 20 and the sleeve 50 can movably pivot and can also drive the handle 60 so that the users can perform angle adjustment according to requirements so as to adjust the quick-disassembly nipple connector structure to the proper position, thus, improving the service efficiency. In addition, the quick-disassembly nipple connector structure is not limited by narrow spaces, thus, facilitating operation and improving the product competitiveness.

In conclusion, the above embodiments and drawings are only preferred embodiments and drawings of the present invention and are not used for limiting the protection scope of the present invention. Any modifications, equivalent substitutes and improvements based on the spirit and principle of the present invention should fall within the protection scope of the present invention.

What is claimed is:

1. A quick-disassembly nipple connector structure, suitable for being connected to a grease nipple, and comprising:
   a hollow pipe, wherein the hollow pipe extends in an axial direction and is provided with a handheld part, a screwing part opposite to the handheld part, and a pivoting part located between the handheld part and the screwing part;
   a pivoting assembly, wherein the pivoting assembly is disposed around the pivoting part in a pivoting manner and abuts against the handheld part;
   a screwing member, wherein the screwing member is in screw joint with the screwing part and is concavely provided with a ring groove;
   a plurality of gripping jaws, wherein each said gripping jaw is provided with a first sleeving end to be disposed around the ring groove and a second sleeving end opposite to the first sleeving end and to be disposed around the grease nipple;
   a sleeve, wherein the sleeve is pivoted on the screwing member and the plurality of gripping jaws in a manner of reciprocating in the axial direction, is provided with a convex abutting part having a convex inner circular wall and abutting against the plurality of gripping jaws and a joint hole penetrating through the sleeve, and is capable of moving between a lock position and a release position; when located at the lock position, the sleeve is close to the pivoting assembly, and the plurality of gripping jaws protrude out of the joint hole; and when located at the release position, the sleeve is away from the pivoting assembly, and the plurality of gripping jaws do not protrude out of the joint hole;

a handle, wherein the handle is disposed on the pivoting assembly and the sleeve to drive the sleeve to move to the lock position or the release position in the axial direction, and the handle is driven by the pivoting assembly and the sleeve to pivot synchronously along with the pivoting assembly and the sleeve; and a spring, wherein the spring is disposed outside the pivoting assembly and contacts the handle and the pivoting assembly, wherein the spring stores an elastic force and the grease nipple is allowed to be sleeved with the second sleeving ends of the plurality of gripping jaws when the handle is actuated to drive the sleeve to move to the release position; and the spring provides the elastic force to push the handle back for driving the sleeve move to the lock position so that the grease nipple is locked by the plurality of gripping jaws, when the handle is not actuated and the grease nipple is sleeved with the second sleeving ends of the plurality of gripping jaws.

2. The quick-disassembly nipple connector structure according to claim 1, wherein the spring is a torsion spring.

3. The quick-disassembly nipple connector structure according to claim 1, wherein the quick-disassembly nipple connector structure further comprises a shaft lever, which penetrates through the handle and is sleeved with the spring; and the spring is provided with a first abutting part abutting against the handle and a second abutting part opposite to the first abutting part and abutting against the pivoting assembly.

4. The quick-disassembly nipple connector structure according to claim 1, wherein the hollow pipe is concavely provided with a positioning ring groove located between the screwing part and the pivoting part; and the quick-disassembly nipple connector structure further comprises a C-shaped retaining ring, which is disposed in the positioning ring groove and has an end abutting against the sleeve and an end abutting against the pivoting assembly.

5. The quick-disassembly nipple connector structure according to claim 1, wherein the hollow pipe is concavely provided with a limiting ring groove, which is located between the pivoting part and the screwing part and is covered by the pivoting assembly; the quick-disassembly nipple connector structure further comprises four locking components and two spacers; each said locking component is provided with a head and a body connected to the head; two of the four locking components respectively penetrate through the two spacers to be locked on the pivoting assembly, with the heads abutting against the spacers and the bodies corresponding to the limiting ring groove; and the other two said locking components are locked on the sleeve, with the heads abutting against the sleeve.

\* \* \* \* \*